United States Patent [19]

Nishida et al.

[11] 4,325,334

[45] Apr. 20, 1982

[54] PRECHAMBER CUP FOR AN INTERNAL COMBUSTION ENGINE

[75] Inventors: Katsutoshi Nishida; Syoji Okada, both of Yokohama; Akio Ando, Kawasaki; Masato Sakai, Yokohama, all of Japan

[73] Assignee: Tokyo Shibaura Denki Kabushiki Kaisha, Kawasaki, Japan

[21] Appl. No.: 131,279

[22] Filed: Mar. 17, 1980

[30] Foreign Application Priority Data

Aug. 2, 1979 [JP] Japan .................................. 54-98096

[51] Int. Cl.³ ........................ F02B 19/16; F02B 19/18
[52] U.S. Cl. .................................... 123/270; 123/286
[58] Field of Search ............... 123/254, 255, 270, 271, 123/272, 286, 275

[56] References Cited

U.S. PATENT DOCUMENTS 2,865,346 12/1958 Liebel .................................. 123/271

FOREIGN PATENT DOCUMENTS

| | | |
|---|---|---|
| 408808 | 4/1934 | United Kingdom . |
| 486289 | 6/1938 | United Kingdom . |
| 724943 | 2/1955 | United Kingdom . |
| 845796 | 8/1960 | United Kingdom . |
| 901983 | 7/1962 | United Kingdom . |
| 1534761 | 12/1978 | United Kingdom . |

OTHER PUBLICATIONS

"Ceramics for High Performance Application"–II, Chapter 45, The Performance of Ceramics in the Diesel Engine, by Godfrey, 1978, pp. 887–892.

*Primary Examiner*—Tony M. Argenbright
*Attorney, Agent, or Firm*—Oblon, Fisher, Spivak, McClelland & Maier

[57] ABSTRACT

A prechamber cup for an internal combustion engine which is made of ceramic material and designed to have a sintered and surface finished exterior wall which is to be fit in a cylinder head, a sintered and surface finished passage portion through which a gas is passed and a sintered interior wall forming cup-shaped portion.

20 Claims, 1 Drawing Figure

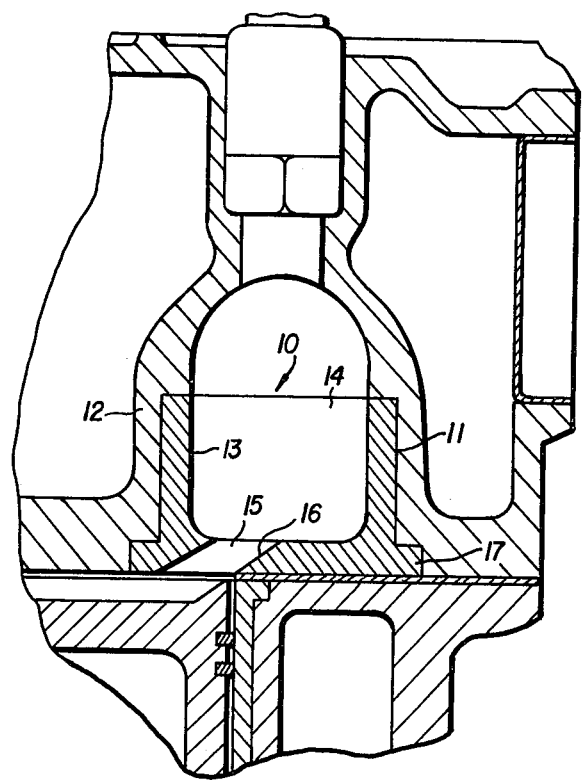

PRECHAMBER CUP FOR AN INTERNAL COMBUSTION ENGINE

BACKGROUND OF THE INVENTION

1. Field of the Invention

This invention relates to a prechamber cup for an internal combustion engine.

2. Description of the Prior Art

A prechamber cup formed by ceramics is shown at pages 889–891 of "CERAMICS FOR HIGH PERFORMANCE APPLICATION-II" published in 1978 by Brook Hill Publishing Company. The above-mentioned prechamber cup is formed of reaction bonded silicon nitride. The main object of making a ceramic prechamber cup is to replace expensive nickel alloys by cheaper, non-strategic materials and to be able to operate the internal combustion engine at high temperatures.

However, it has been found to be necessary to improve the design in making the prechamber cup of ceramics.

SUMMARY OF THE INVENTION

Accordingly, it is an object of this invention to provide a prechamber cup formed of ceramic material having a desirable surface condition on the exterior wall.

A further object of this invention is to provide a prechamber cup formed of ceramic material having a gas passage portion with a desirable surface condition.

Another object of this invention is to provide a prechamber cup formed of ceramic material having a desirable surface condition along the interior wall of a cup-shaped portion.

These and other objects of the present invention have been attained by providing a prechamber cup made of ceramic material which is designed to have a surface finished exterior wall so as to be fit within a cylinder head, a surface finished gas passage portion and a sintered interior wall forming a cup-shaped portion.

BRIEF DESCRIPTION OF THE DRAWINGS

Various objects, features and attendant advantages of the present invention will become clear when considered in connection with the accompanying drawing wherein:

The sole FIGURE is a partial cross sectional view of an internal combustion engine utilizing the prechamber cup of the present invention.

DETAILED DESCRIPTION OF THE PREFERRED EMBODIMENTS

As seen from the sole FIGURE a prechamber cup 10 includes an exterior wall 11 which is to be fit within a cylinder head 12 wherein the interior wall 13 forms a cup-shaped portion and includes a gas passage 15. The prechamber cup 10 according to this invention envisions various surfaces for improving the surface condition thereof. The surface of the exterior wall 11 and the surface 16 of the gas passage 15 are surface finished in accordance with the present invention.

Where the surface of the exterior wall is surface finished, it is easy to fit the prechamber cup within the cylinder head 12. The preferable surface roughness of the exterior wall is below 2S (The dimension "S" is used to indicate the surface roughness of the members according to the Japanese Industrial Standard B 0601 in which $S(m) = RMS(m) \times 4/1.1$). More preferably, the surface roughness of the exterior wall is 0.8S to 2S, because where the surface roughness falls below 0.8S, the cost and time necessary for such surface finishing will become high and long.

Where the surface of the gas passage 15 is surface finished, the pressure loss of gas passing therethrough decreases. The preferable surface roughness of the surface of the passage is below 2S. More preferably, the surface roughness is 0.8S to 2S.

Where the surface of the cup-shaped portion is sintered, the surface roughness will be more than 2S. As the surface of the cup-shaped portion is increasingly roughened, the efficiency of the combustion and stirring of fuel will be increased. The more desirable surface roughness of the cup-shaped portion is between 2S and 10S.

The prechamber cup according to this invention is used in such applications as require great resistance to heat stress. Therefore, preferably, the ceramic body is formed of such nitride materials as silicon nitride, aluminum nitride, titanum nitride and zirconium nitride, oxynitride materials such as silicon oxynitride ($Si_2ON_2$) and silicon aluminum oxynitride (SiAlON), carbide materials such as silicon carbide, boron carbide, titanium carbide and zirconium carbide, carbonitride materials such as silicon nitride—silicon carbide ($Si_3N_4$—SiC), and glass ceramics such as MAS (Mg—Al—Si oxide) and LAS (Li—Al—Si oxide).

Any sintering method can be applied to obtain the prechamber cup of this invention. For instance, hot pressing, reaction sintering and furnace sintering are well known as ceramic sintering methods. Preferable sintering methods for obtaining the prechamber cup of this invention are hot pressing or furnace sintering. Where the prechamber cup is formed by hot pressing or furnace sintering, it is easy to obtain the prechamber cup with a ceramic body having a density higher than 90% of the theoretical value. This value of density is the desirable value for the prechamber cup. Still more, where the ceramic material is silicon nitride, silicon carbide, aluminum nitride, silicon oxynitride, silicon aluminum oxynitride or silicon nitride—silicon carbide, it is relatively easy to obtain a ceramic body having a flexural strength greater than 50 kg/cm² at 800° C. This strength value is the desirable value for the prechamber cup.

EXAMPLE

A powder mixture consisting of 90% by weight of silicon nitride, 5% by weight of yttrium oxide and 5% by weight of aluminum oxide, the mean particle size thereof being 1.1, 1.2 and 0.5 microns, respectively, was prepared and 5% by weight of paraffin was used as a binder. The mixture was molded and sintered and sintering was performed by furnace sintering. The sintering condition was at a temperature 1800° C. for 1 hour in an atmosphere of nitrogen gas. The size of the sintered body having a prechamber cup shape as shown in the sole FIGURE was 40 mm for the outer diameter of base 17, 35 mm for the outer diameter of the outer or exterior wall 11, 28 mm for the inner diameter of the cup-shaped interior wall portion 13, 10 mm for the inner diameter of the gas passage 15 and 28 mm in height. The density was 97% of theoretical value and the flexural strength at 800° C. was 73 kg/mm².

The outer or exterior wall surface 11 and the inner surface 16 of the gas passage 15 of the prechamber cup 10 formed by above-mentioned process, were ground. The surface roughnesses were 1.0S for the outer wall, 1.0S for the inner surface 16 of the gas passage 15 and 9S for the inner or interior wall surface 13 of the cup-shaped portion, respectively.

The prechamber cup 10 was then set in the internal combustion engine and subsequently tested. As a result, highly desirable combustion efficiency was certified.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A prechamber cup for insertion within a cylinder head, said cup formed of a ceramic material and including a surface finished exterior wall portion positioned within said cylinder head, a surface finished gas passage portion and a sintered non-surface finished interior wall portion forming a cup-shaped portion, said gas passage portion extending from said interior wall portion to said exterior wall portion.

2. A prechamber cup according to claim 1, wherein the surface roughness of said exterior wall is below 2S wherein S indicates a surface roughness in accordance with Japanese Industrial Standard B 0601.

3. A prechamber cup according to claim 1, wherein the surface roughness of said exterior wall portion is between 0.8S to 2S wherein S indicates a surface roughness in accordance with Japanese Industrial Standard B 0601.

4. A prechamber cup according to claim 1, wherein the surface roughness of said gas passage portion is below 2S wherein S indicates a surface roughness in accordance with Japanese Industrial Standard B 0601.

5. A prechamber cup according to claim 1, wherein the surface roughness of said gas passage portion is between 0.8S to 2S wherein S indicates a surface roughness in accordance with Japanese Industrial Standard B 0601.

6. A prechamber cup according to claim 1, wherein the surface roughness of said interior wall of the cup-shaped portion is between 2S to 10S wherein S indicates a surface roughness in accordance with Japanese Industrial Standard B 0601.

7. The prechamber cup according to claim 1, wherein said ceramic material comprises nitride.

8. The prechamber cup according to claim 1, wherein said ceramic material comprises carbide.

9. The prechamber cup according to claim 8, wherein said ceramic material comprises silicon carbide.

10. The prechamber cup according to claim 1, wherein said ceramic material comprises oxynitride.

11. The prechamber cup according to claim 11, wherein said ceramic material comprises silicon oxynitride.

12. The prechamber cup according to claim 11, wherein said ceramic material comprises silicon aluminum oxynitride.

13. The prechamber cup according to claim 1, wherein said ceramic material comprises carbonitride.

14. A prechamber cup according to claim 7, wherein said nitride comprises silicon nitride.

15. A prechamber cup according to claim 7, wherein said nitride comprises aluminum nitride.

16. A prechamber cup according to claim 1, wherein said ceramic material comprises glass-ceramic material.

17. A prechamber cup according to claim 1, wherein said ceramic material is formed by hot pressing.

18. The prechamber cup according to claim 1, wherein said ceramic material is formed by furnace sintering.

19. A prechamber cup according to claim 13, wherein said carbonitride comprises silicon nitride silicon carbide.

20. A prechamber cup according to claim 1, wherein said ceramic material comprises sintered ceramic material.

* * * * *

UNITED STATES PATENT AND TRADEMARK OFFICE
CERTIFICATE OF CORRECTION

PATENT NO. : 4,325,334

DATED : April 20, 1982

INVENTOR(S) : Katsutoshi Nishida et al.

It is certified that error appears in the above-identified patent and that said Letters Patent is hereby corrected as shown below:

Column 2, line 45, change "50 $kg/cm^2$" to --50 $kg/mm^2$--.

Signed and Sealed this

Thirteenth Day of November 1984

[SEAL]

Attest:

GERALD J. MOSSINGHOFF

Attesting Officer

Commissioner of Patents and Trademarks